(12) United States Patent
Djelassi

(10) Patent No.: US 10,036,330 B2
(45) Date of Patent: Jul. 31, 2018

(54) METHOD AND MODULE FOR FILTERING A RAW SETPOINT

(71) Applicant: SNECMA, Paris (FR)

(72) Inventor: Cedrik Djelassi, Moissy-Cramayel (FR)

(73) Assignee: SNECMA, Paris (FR)

( * ) Notice: Subject to any disclaimer, the term of this patent is extended or adjusted under 35 U.S.C. 154(b) by 18 days.

(21) Appl. No.: 14/910,825

(22) PCT Filed: Jul. 30, 2014

(86) PCT No.: PCT/FR2014/051978
§ 371 (c)(1),
(2) Date: Feb. 8, 2016

(87) PCT Pub. No.: WO2015/019003
PCT Pub. Date: Feb. 12, 2015

(65) Prior Publication Data
US 2016/0186669 A1 Jun. 30, 2016

(30) Foreign Application Priority Data
Aug. 9, 2013 (FR) ..................... 13 57910

(51) Int. Cl.
| | |
|---|---|
| F02C 9/26 | (2006.01) |
| G05B 11/01 | (2006.01) |
| G05B 19/404 | (2006.01) |
| G05B 19/416 | (2006.01) |
| B64D 27/16 | (2006.01) |
| B64D 31/06 | (2006.01) |

(52) U.S. Cl.
CPC .............. *F02C 9/263* (2013.01); *B64D 27/16* (2013.01); *B64D 31/06* (2013.01); *G05B 11/01* (2013.01); *G05B 19/404* (2013.01); *G05B 19/416* (2013.01); *F05D 2220/323* (2013.01); *F05D 2270/021* (2013.01)

(58) Field of Classification Search
CPC ......... F02C 9/263; B64D 31/06; B64D 27/16; G05B 11/01; G05B 19/404; G05B 19/416; F05D 2270/021; F05D 2220/323
See application file for complete search history.

(56) References Cited

U.S. PATENT DOCUMENTS 8,037,955 B2 * 10/2011 Huber ................... B60W 10/06
180/65.28
2007/0250239 A1 * 10/2007 Roudeau ............. B60W 30/188
701/60

FOREIGN PATENT DOCUMENTS

| DE | 10 2004 050 994 A1 | 4/2006 |
|---|---|---|
| DE | 10 2007 027 827 A1 | 2/2008 |
| FR | 2 870 792 A1 | 12/2005 |

OTHER PUBLICATIONS

WEST Control Solutions "Pre-Tune" (see attached PDF).*

(Continued)

*Primary Examiner* — Mussa A Shaawat
*Assistant Examiner* — Michael V Kerrigan
(74) *Attorney, Agent, or Firm* — Bookoff McAndrews, PLLC

(57) ABSTRACT

This module (5) serves to filter a raw setpoint (N1_CMD_OP) for a corrector network (6) in a system (20) for regulating an engine. It comprises:
a module (54) for detecting a filtering condition for filtering said raw setpoint; and
means for supplying said corrector network with a filtered setpoint (N1_CMD_LIM) instead of said raw setpoint when the filtering condition is detected.

13 Claims, 4 Drawing Sheets

(56) References Cited

OTHER PUBLICATIONS

English Translation of Search Report dated Dec. 3, 2014, in corresponding International PCT Application No. PCT/FR2014/051978, filed on Jul. 30, 2014 (3 pages).

* cited by examiner

METHOD AND MODULE FOR FILTERING A RAW SETPOINT

CROSS-REFERENCE TO RELATED APPLICATIONS

This application is the U.S. national phase entry under 35 U.S.C. § 371 of International PCT Application No. PCT/FR2014/051978, filed on Jul. 30, 2014, which claims priority to French Patent Application No. FR 1357910, filed on Aug. 9, 2013, the entireties of each of which are incorporated by reference herein.

BACKGROUND OF THE INVENTION

The invention relates to the general field of managing a setpoint in an engine.

It seeks more particularly to minimize the problem of overshoot as occurs in particular in systems operating in a servo-control mode and in which the adjusted value temporarily exceeds the level of the variable setpoint.

The invention finds a particular but non-limiting application in a system for regulating a turbojet, where the role of such a system is to maintain the operating point of the jet so as to obtain the thrust requested by the pilot.

Specifically, and in particular in the field of turbojets, in order to able to absorb this overshoot phenomenon, it is necessary to provide a safety margin between the maximum speed to be reached for delivering the specified thrust, and the mechanical strength limits of the jet, with this overdimensioning leading in harmful manner to an increase in the weight of the turbojet.

In the field of turbojets, in order to avoid or limit overshoot phenomena, it is common practice to act on the adjustment of the speed control corrector network that generates the fuel flow rate command for the fuel metering units of the turbojet.

Unfortunately, those methods degrade the performance of the corrector, including during operating stages for which the initial adjustment was satisfactory. They also require metering units that are fast and relatively expensive in order to be capable of responding to the setpoints transmitted by the corrector network.

The invention seeks in particular to mitigate those drawbacks.

OBJECT AND SUMMARY OF THE INVENTION

The present invention satisfies this need by proposing a method of filtering a raw setpoint for a corrector network in a system for regulating an engine. The method comprises:
  a step of detecting a filtering condition for filtering the raw setpoint; and
  a step of supplying a filtered setpoint to the corrector network instead of the raw setpoint when the filtering condition is detected.

Thus, and in general manner, the invention proposes a solution seeking to filter the setpoint upstream from the corrector network, thereby making it possible to avoid all of the problems inherent to replacing or adjusting the corrector network.

In a particular implementation of the invention, the filtering condition is true when the engine speed exceeds a protection threshold value.

This particular implementation makes it possible advantageously to take action only on engine speeds that are very high, close to the mechanical strength limits of the engine.

In a particular implementation of the invention:
  the filtered setpoint is limited to a threshold value so long as the engine speed has not stabilized around the filtered setpoint; and
  the filtered setpoint is increased progressively until it reaches the raw setpoint once the engine speed has stabilized around the filtered setpoint.

This implementation makes it possible to slow down speed gradients at the end of acceleration so as to approach the final setpoint sufficiently slowly to avoid overshoot.

Correspondingly, the invention also provides a module for filtering a raw setpoint for a corrector network in a system for regulating an engine, the module comprising:
  a module for detecting a filtering condition for filtering the raw setpoint; and
  means for supplying the corrector network with a filtered setpoint instead of the raw setpoint when the filtering condition is detected.

The invention also provides a system for regulating a turbojet and including a filter module as mentioned above, a corrector network, a jet, and a speed sensor.

The invention also provides a turbojet including a regulator system as mentioned above.

BRIEF DESCRIPTION OF THE DRAWINGS

Other characteristics and advantages of the present invention appear from the following description made with reference to the accompanying drawings, which show an embodiment having no limiting character.

In the figures.

DETAILED DESCRIPTION OF THE INVENTION

Figure 1:
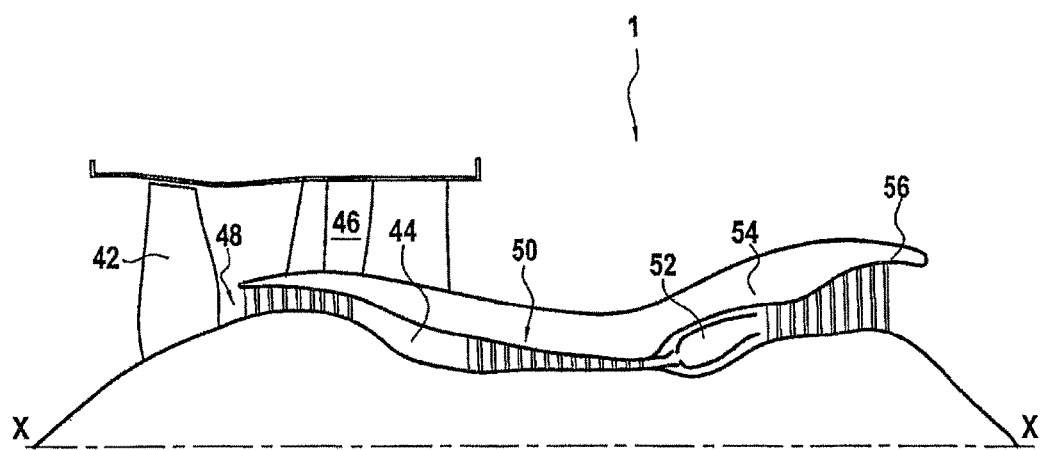
FIG. 1 is a diagrammatic view of a turbojet in a particular embodiment of the invention.

FIG. 1 is a diagram of an aircraft turbojet 1 in accordance with a particular embodiment of the invention.

In known manner, the turbojet of longitudinal axis X-X comprises in particular a fan 42 that delivers a stream of air into a primary stream flow passage 44 and into a secondary stream flow passage 46 that is coaxial around the primary stream flow passage.

From upstream to downstream, in the flow direction of the gas stream passing therethrough, the primary stream flow passage 44 includes: a low pressure compressor 48; a high pressure compressor 50; a combustion chamber 52; a high pressure turbine 54; and a low pressure turbine 56.

Figure 2:
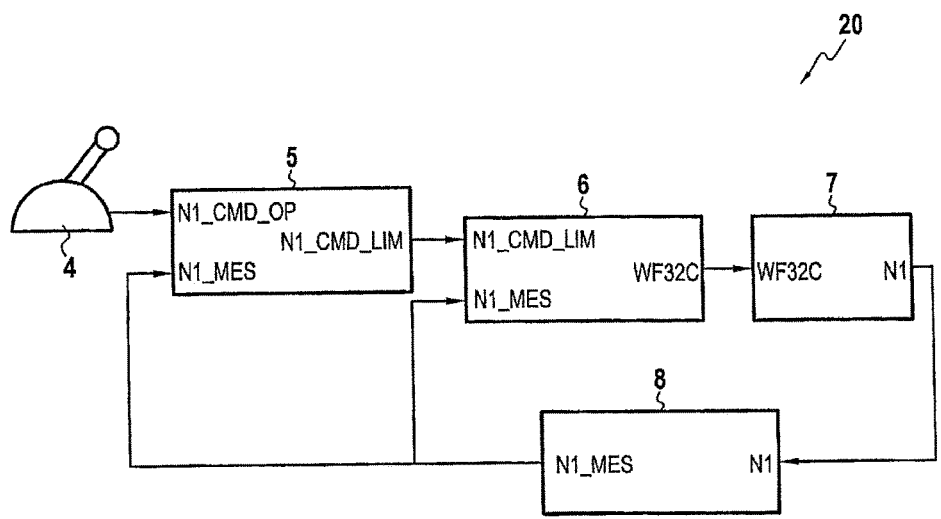
FIG. 2 shows a regulator system in a particular embodiment of the invention.

The turbojet 1 is regulated by a regulator system 20 of the invention and shown in FIG. 2. In general manner, the regulator system determines a fuel flow rate setpoint WF32C and causes fuel to be injected into the turbojet as a function of the fuel flow rate setpoint as determined.

In the presently-described embodiment, the regulator system 20 comprises a filter module 5 in accordance with the invention, a corrector network 6, a jet 7, and a speed sensor 8.

In known manner, the corrector network 6 provides the fuel flow setpoint WF32C to the jet 7 as a function of the difference between the engine speed setpoint N1_CMD_LIM and a measured engine speed N1_MES as determined by the speed sensor 8.

In remarkable manner, the engine speed setpoint N1_CMD_LIM as determined by the filter module 5 is a setpoint that is filtered on approaching the mechanical strength limits of the turbojet 1.

In the presently-described embodiment, the filter module 5 determines the filtered engine speed setpoint N1_CMD_LIM as a function of a raw engine speed setpoint C1_CMD_OP, which is proportional to the position of a throttle lever 4 controlled by a pilot of the aircraft, and as a function of the measured engine speed N1_MES as determined by the speed sensor.

Figure 3:
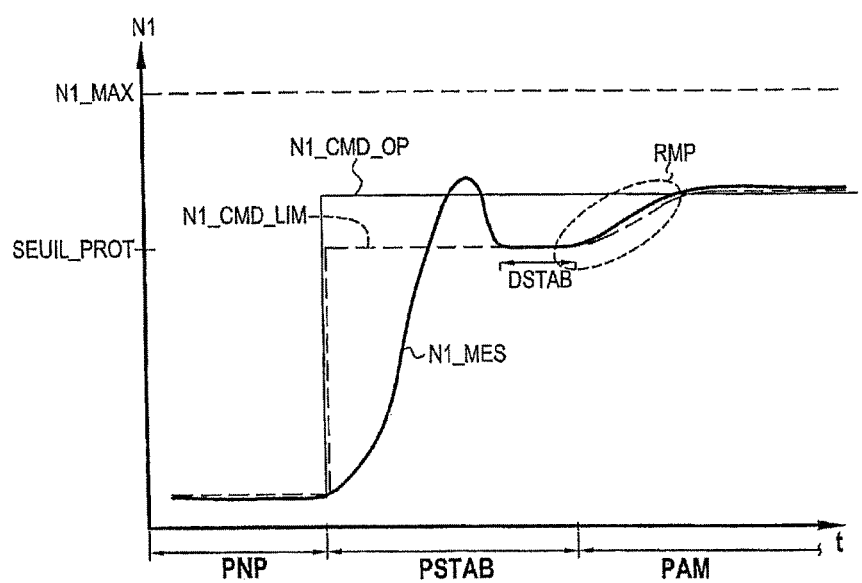
FIG. 3 shows a principle for filtering a setpoint in accordance with a particular implementation of the invention.

FIG. 3 shows the principle on which the filter module 5 operates. In this figure:
- the abscissa axis is an axis plotting time t;
- the ordinate axis shows engine speed, i.e. in this example the speed of rotation of the high pressure spool 50, 54;
- the engine speed limit N1_MAX defined by the mechanical characteristics of the turbojet;
- the raw engine speed setpoint N1_CMD_OP;
- the filtered engine speed setpoint N1_CMD_LIM; and
- the measured engine speed N1_MES.

In accordance with the invention, the filtered engine speed setpoint N1_CMD_LIM is governed in three stages, namely:
- a non-protection, first stage (PNP) so long as the raw engine speed setpoint N1_CMD_OP is less than a protection threshold SEUIL_PROT, during which stage the filtered setpoint N1_CMD_LIM corresponds exactly to the raw setpoint N1_CMD_OP, with no raw setpoint correction being performed;
- a stabilization, second stage (PSTAB) during which the filtered engine speed setpoint N1_CMD_LIM is forced to the value of the protection threshold SEUIL_PROT when the raw engine speed setpoint N1_CMD_OP exceeds this protection threshold SEUIL_PROT and so long as the engine speed N1_MES has not stabilized around the limited engine speed setpoint N1_CMD_LIM; and
- a moderate acceleration, third stage (PAM) during which the limited engine speed setpoint N1_CMD_LIM is caused progressively to come closer to the raw engine speed setpoint N1_CMD_OP following a moderate ramp RMP, once the engine speed N1_MES has stabilized around the filtered setpoint N1_CMD_LIM for a stabilization duration DSTAB.

In the presently-described implementation, the stabilization duration DSTAB is selected to be about 0.5 seconds (s) and the ramp RMP has a gradient of about 200 revolutions rpm/s enabling the nominal control level to be reached in about 0.8 s.

Figure 4:
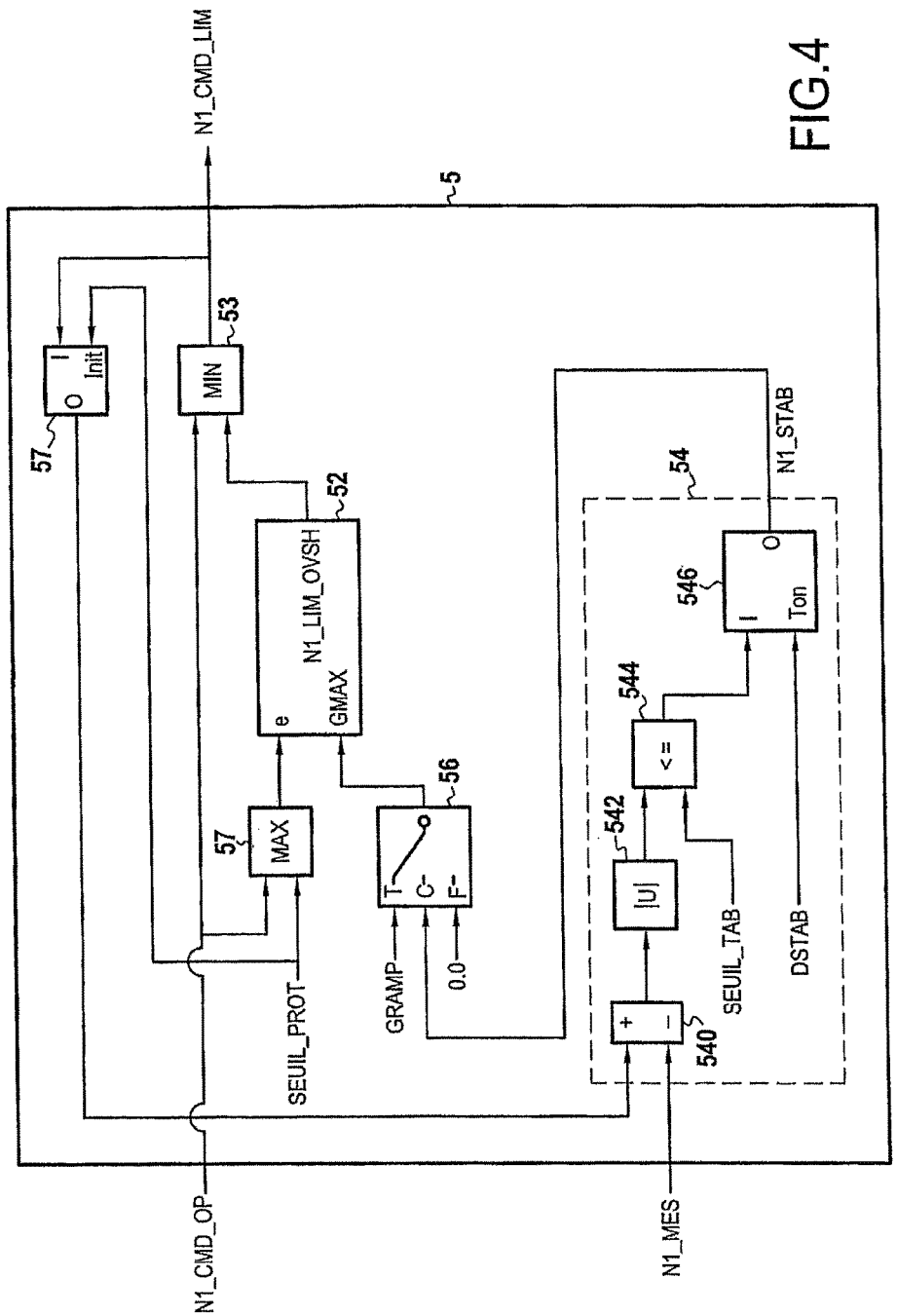
FIG. 4 is a diagram showing a filter module in accordance with a particular embodiment of the invention.

FIG. 4 shows a filter module in a particular embodiment of the invention.

In the description below, consideration is given to signals and parameters that are sampled with a sampling period Te. By way of example, this sampling period may be of the order of 20 milliseconds (ms) to 40 ms.

Nevertheless, it should be observed that the invention could equally well be implemented using signals and parameters that are continuous.

As described above, the filter module 5 receives as input the raw engine speed setpoint N1_CMD_OP and the engine speed measurement N1_MES; and it outputs the filtered engine speed setpoint N1_CMD_LIM.

Figure 5:
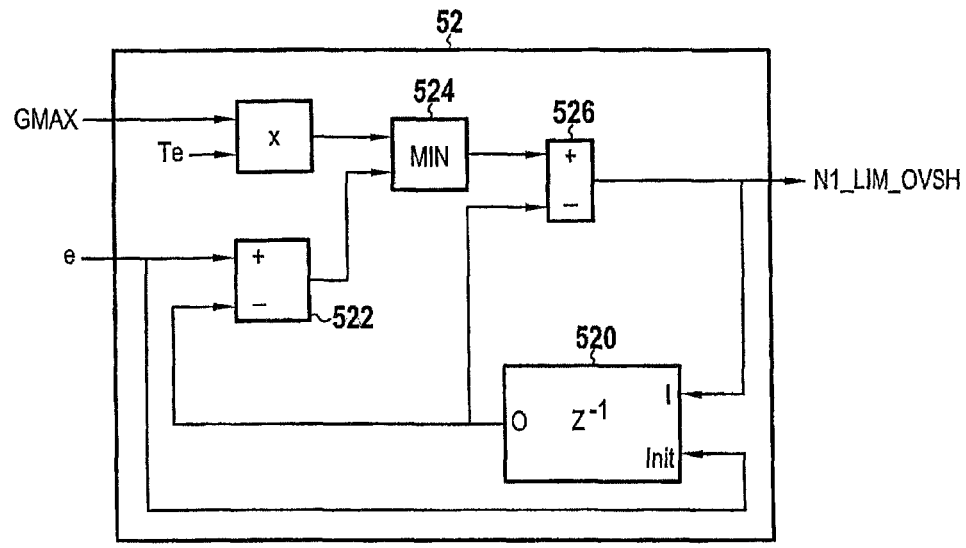
FIG. 5 is a diagram showing a gradient limiter that can be used in the FIG. 4 filter module.

In the presently-described implementation, the filter module 5 includes a gradient limiter 52, described below with reference to FIG. 5, that is suitable for returning a value N1_LIM_OVSH in compliance with the above-described non-protection stage PNP, stabilization stage PSTAB, and moderate acceleration stage PAM. More precisely, the value N1_LIM_OVSH:
- is equal to the protection threshold SEUIL_PROT during the non-protection stage PNP and the stabilization stage PSTAB; and
- increases progressively from the protection threshold SEUIL_PROT to the raw engine speed setpoint N1_CMD_OP following the ramp RMP during the moderate acceleration stage PAM.

In the presently-described implementation, the filtered engine speed setpoint N1_CMD_LIM is the minimum of the value N1_LIM_OVSH returned by the gradient limiter 52 and the raw engine speed setpoint N1_CMD_OP (module MIN reference 53 in FIG. 4).

The filter module 5 includes a module 54 suitable for determining whether the engine speed N1_MES has stabilized around the filtered engine speed setpoint N1_CMD_LIM for a duration DSTAB, which condition is necessary for the stabilization stage PSTAB.

In the presently-described implementation, the module 54 comprises:
- a subtracter 540 suitable for obtaining the difference between the engine speed measurement N1_MES(n) and the filtered engine speed setpoint N1_CMD_LIM (n−1) at the preceding sample (delay element 57, FIG. 4);
- an element 542 known to the person skilled in the art and suitable for determining the absolute value of this difference;
- a comparator 544 suitable for comparing the absolute value with a stabilization threshold SEUIL_STAB close to zero; and
- a counter 546 suitable for returning a signal N1_STAB of value TRUE as soon as the input I of the counter 546 is TRUE for the duration DSTAB.

The gradient limiter 52 is described with reference to FIG. 5. It receives as input:
- a gradient value GMAX determined by a gradient selector 56, which is equal to zero when the engine speed N1_MES has not stabilized (N1_STAB=FALSE), and which is equal to a ramp gradient value GRAMP when the engine speed has stabilized (N1_STAB=TRUE); and
- the maximum value e between the raw engine speed setpoint N1_CMD_OP and the protection threshold SEUIL-PROT (module MAX, reference 57 in FIG. 4). When the system starts, the value e is thus equal to SEUIL PROT.

The gradient limiter 52 includes a delay 520 that is initialized at the protection threshold SEUIL_PROT and that is suitable for supplying the value of the output signal at the preceding sample N1_LIM_OVSH(n−1).

The gradient limiter 52 includes a subtracter module 522 suitable for calculating the difference between the input value and N1_LIM_OVSH(n−1). Throughout the non-protection stage PNP, the output from the subtracter module 522 is thus equal to zero.

The gradient limiter 52 includes a module 524 suitable for determining the minimum between the output from the subtracter module 522 and the value GMAX, which is equal to zero so long as the engine speed has not stabilized.

The gradient limiter includes an adder module 526 suitable for supplying the output signal N1_LIM_OVSH(n) by adding the output from the module 524 and the value of the output signal at the preceding sample N1_LIM_OVSH(n−1).

Throughout the entire non-protection stage PNP, the output signal N1_LIM_OVSH is thus equal to the protection threshold SEUIL_PROT.

When the raw engine speed threshold N1_CMD_OP exceeds the protection threshold SEUIL_PROT, the output from the subtracter module 522 becomes positive.

However throughout the stabilization stage PSTAB, the gradient value GMAX determined by the gradient selector 56 remains zero, so that the output signal N1_LIM_OVSH remains equal to the protection threshold SEUIL_PROT.

Once the engine speed N1_MES has stabilized around the filtered engine speed setpoint N1_CMD_LIM, the gradient value GMAX takes the ramp gradient value GRAMP such that the output signal N1_LIM_OVSH increases progressively from the protection threshold SEUIL_PROT up to the raw engine speed setpoint N1_CMD_OP, following the ramp of the moderate acceleration stage PAM.

Figure 6:
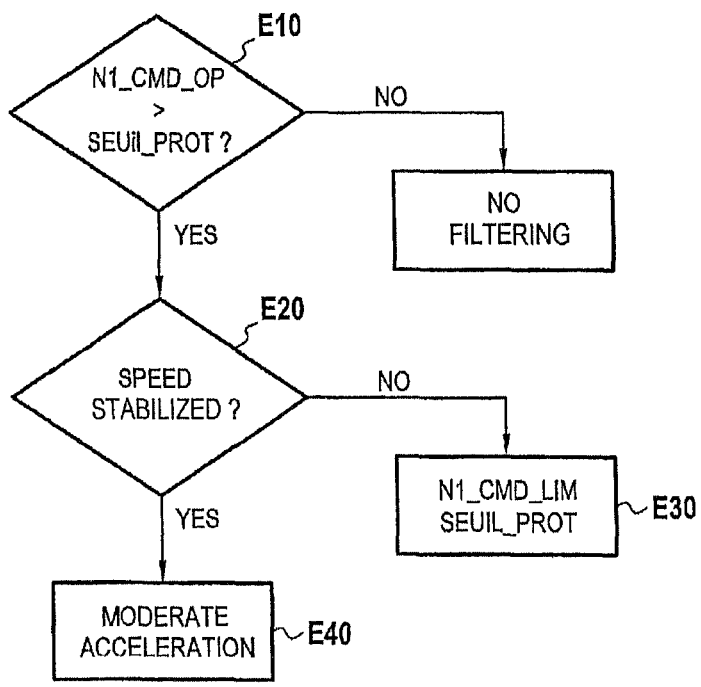
FIG. 6 is a flow chart showing the main steps of a setpoint filtering method in accordance with a particular implementation of the invention.

FIG. 6 shows a setpoint filter method in accordance with a particular implementation of the invention.

This method has a step E10 during which it is verified whether the filtering condition for filtering the raw setpoint is true. In the presently-described implementation, this consists in verifying whether the raw setpoint N1_CMD_OP is greater than the protection threshold SEUIL_PROT. If not, then the raw setpoint is sent to the corrector network 6 without modification.

If the filtering condition is detected, then during a step E20, it is verified whether the engine speed N1_MES has stabilized around the filtered setpoint N1_CMD_LIM. If not, the filtered setpoint sent to the corrector network 6 is limited to the value of the protection threshold SEUIL_PROT (step E30).

Once the engine speed N1_MES has stabilized around the filtered setpoint N1_CMD_LIM, then the filtered setpoint N1_CMD_LIM is increased progressively until it reaches the raw setpoint N1_CMD_OP (step E40).

The invention claimed is:

1. A method of filtering a raw setpoint for a corrector network in a system for regulating an engine speed, said method comprising:
   detecting a filtering condition for filtering the raw setpoint, wherein detecting the filtering condition comprises determining that the raw setpoint exceeds a protection threshold value;
   filtering the raw setpoint to generate a filtered setpoint of the engine speed when the filtering condition is detected; and
   supplying the filtered setpoint to the corrector network instead of the raw setpoint when the filtering condition is detected,
   wherein filtering the raw setpoint to generate the filtered setpoint comprises:
      setting the filtered setpoint to the protection threshold value when the filtering condition is detected;
      maintaining the filtered setpoint at the protection threshold value until the engine speed has stabilized, for a stabilization duration, around the set filtered setpoint; and
      increasing the filtered setpoint progressively up to the raw setpoint once the engine speed has stabilized for the stabilization duration around the set filtered setpoint.

2. The method of claim 1, wherein the filtering condition is detected, the method further comprising determining whether the engine speed has stabilized around the filtered setpoint.

3. The method of claim 1, wherein progressively increasing the filtered setpoint comprises progressively increasing the filtered setpoint according to a ramp.

4. The method of claim 1, further comprising supplying the raw setpoint to the corrector network so long that the filtering condition is not detected.

5. A module for filtering a raw setpoint for a corrector network in a system for regulating an engine speed, said module comprising:
   a first module configured to detect a filtering condition for filtering the raw setpoint, wherein the first module detects the filtering condition by determining that the raw setpoint exceeds a protection threshold value;
   a gradient limiter configured to filter the raw setpoint to generate a filtered setpoint of the engine speed when the filtering condition is detected, wherein filtering the raw setpoint comprises:
      setting the filtered setpoint to the protection threshold value when the filtering condition is detected;
      maintaining the filtered setpoint at the protection threshold value until the engine speed has stabilized, for a stabilization duration, around the set filtered setpoint; and
      increasing the filtered setpoint progressively up to the raw setpoint once the engine speed has stabilized for the stabilization duration around the set filtered setpoint;
   and
   a second module configured to supply the corrector network with the filtered setpoint instead of the raw setpoint when the filtering condition is detected.

6. The module of claim 5, further comprising:
   a third module configured, when the filtering condition is detected, to determine whether the engine speed has stabilized around the filtered setpoint.

7. The module of claim 5, wherein the gradient limiter is configured to gradually increase the filtered setpoint according to a ramp.

8. The module of claim 5, wherein the second module is configured to supply the raw setpoint to the corrector network so long that the filtering condition is not detected.

9. A system for regulating a turbojet, the system comprising a filtering module according to claim 5, a corrector network, a jet, and a speed sensor.

10. A turbojet including a regulator system according to claim 9.

11. A method of filtering a raw setpoint in a system for regulating an engine speed, comprising:
   determining whether the raw setpoint exceeds a protection threshold value;
   if the raw setpoint exceeds the protection threshold value, filtering the raw setpoint to generate a filtered setpoint wherein said filtering comprises:
      setting the filtered setpoint to the protection threshold value;
      maintaining the filtered setpoint at the protection threshold value until the engine speed has stabilized, for a stabilization duration, around the set filtered setpoint; and increasing the filtered setpoint progressively up to the raw setpoint once the engine speed has stabilized for the stabilization duration around the set filtered setpoint; and supplying the filtered setpoint to a corrector network; and if the raw setpoint does not exceed the protection threshold value, supplying the raw setpoint to the corrector network.

12. The method of claim 11, wherein the raw setpoint exceeds the protection threshold value, the method further comprising determining whether the engine speed has stabilized around the filtered setpoint.

13. The method of claim 12, further comprising gradually increasing the filtered setpoint up to the raw setpoint according to a ramp if the engine speed has stabilized around the filtered setpoint.

* * * * *